US006988778B2

(12) United States Patent
Bacardit

(10) Patent No.: US 6,988,778 B2
(45) Date of Patent: Jan. 24, 2006

(54) PNEUMATIC BRAKE BOOSTER, PARTICULARLY FOR A MOTOR VEHICLE

(75) Inventor: Juan Simon Bacardit, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 10/759,709

(22) Filed: Jan. 9, 2004

(65) Prior Publication Data

US 2004/0140168 A1 Jul. 22, 2004

(51) Int. Cl.
*B60T 8/44* (2006.01)
*F15B 9/10* (2006.01)

(52) U.S. Cl. ................................ 303/114.3; 303/115.1; 91/369.3; 91/376 R; 60/552

(58) Field of Classification Search ............... 91/369.3, 91/376 R; 60/552, 553, 574; 303/114.3, 303/115.1
See application file for complete search history.

(56) References Cited

U.S. PATENT DOCUMENTS 6,655,139 B2 * 12/2003 Bacardit ...................... 60/553

FOREIGN PATENT DOCUMENTS

FR WO 01/89899 A1 * 11/2001

* cited by examiner

*Primary Examiner*—Xuan Lan Nguyen
(74) *Attorney, Agent, or Firm*—Len H. McCormick, Jr.; Warren Comstock

(57) ABSTRACT

A pneumatic brake booster for use in a motor vehicle having a feeler (42) mounted to slide on a plunger (32) located at the end of a control rod (22) and pivoting key (62) for axially blocking the movement of the feeler (42) with respect to the plunger (32) during a normal brake application and unblocking the movement during an emergency brake application to reduce the length of a plunger-feeler assembly and thus increase the jump phase of an output force.

6 Claims, 4 Drawing Sheets

PNEUMATIC BRAKE BOOSTER, PARTICULARLY FOR A MOTOR VEHICLE

BACKGROUND AND SUMMARY OF THE INVENTION

The invention relates to a pneumatic brake booster, particularly for a motor vehicle.

Such a booster comprises a rigid casing in which two chambers are delimited and separated from one another by a moving transverse partition which bears an axial piston on which there acts a plunger mounted at the end of a control rod actuated by a brake pedal and which itself acts via a push rod on a piston of a brake master cylinder. A front chamber of the booster is connected to a source of vacuum and the rear chamber is connected respectively either to the front chamber or to the surrounding atmosphere.

The rear end of the plunger collaborates with an annular shutter of a three-way valve, which is mounted at the rear end of the booster around the control rod and allows the two chambers of the booster to be made to communicate in the rest position, that is to say when there is no braking, and allows them to be isolated from one another then allows the rear chamber to be connected to the surrounding atmosphere under braking.

The atmospheric pressure let into the rear chamber acts on the piston and moves it forward, amplifying the effort applied by the driver to the brake pedal and transmitted by the control rod.

Under normal braking, the control rod and the piston of the booster move at the same rate. When the control rod is in the forward position, the plunger that it bears is pressed against a reaction disk made of a compressible material, such as rubber or an elastomer, mounted in a dish at the rear end of the push rod. The resistive force of the brake circuit is thus passed back by the plunger and the control rod to the brake pedal, and this helps the driver to modulate the effort he is applying to the brake pedal to suit the desired conditions of braking for the vehicle.

Under emergency braking, the control rod and the plunger are made to move forward more quickly than the piston of the booster, and the feedback of force transmitted to the brake pedal may be great even though the booster has not yet provided maximum boost. This may lead the driver to relax the effort he is exerting on the brake pedal prematurely even if, at that moment, the braking effort needs to remain at a maximum.

It has already been proposed for these boosters to be equipped with emergency brake assist means which, when the control rod has been moved to an extreme forward position or into close proximity of this extreme forward position, reduces quite sharply the reaction of the braking circuit on the control rod when the driver partially relaxes the effort applied to the pedal. If the driver has then to press the pedal firmly again, something which often occurs in practice, he can more easily return the control rod to the extreme forward position for maximum braking effort.

These emergency brake assist means generally comprise a feeler mounted to slide at the front end of the plunger and associated with means of axial immobilization with respect to the piston of the booster, making it possible, when the control rod has been brought into an extreme forward position and the driver has partially relaxed the effort exerted on the brake pedal, to cause the piston to withstand at least some of the reaction of the braking circuit without transmitting it to the plunger and to the control rod.

It is a particular object of the invention to improve these emergency brake assist means so that the assistance provided by the booster in the aforementioned case where the driver partially relaxes the effort applied to the brake pedal then reapplies significant effort to this pedal, increases and is a function of the rate of travel of the control rod in the preceding phase of the braking action during which the control rod was moved into its extreme forward position or into close proximity thereof.

To this end, the invention proposes a pneumatic brake booster particularly for a motor vehicle comprising an axial piston interposed between a push rod and a plunger mounted at the end of a control rod, and emergency brake assist means comprising a feeler borne by the plunger and able to be moved in axial sliding with respect to the latter and means of axially immobilizing the feeler characterized in that these immobilizing means are able to block the feeler with respect to the plunger at rest and under braking when the rate of travel of the control rod and of the plunger is below a limit value, and to allow the plunger to slide along the feeler in the direction of reducing the axial length of the plunger and feeler as a whole under emergency braking when the rate of travel of the control rod and of the feeler is above the said limit value.

By virtue of the feeler being blocked along the plunger at rest and under normal braking and of the unblocking that allows the plunger to slide along the feeler under emergency braking, the reduction in overall length of the plunger and feeler as a whole depends on the rate of travel of the control rod and of the plunger under emergency braking. This reduction in the overall length of the plunger and feeler as a whole results in an increase in the jump phase well known to those skilled in the art, and therefore in an increase in the amount of boost supplied by the booster.

According to other features of the invention:

- the feeler comprises means collaborating with the piston to define a position of rest of the plunger,
- these means comprising a pin mounted in a transverse orifice of the feeler,
- the ends of the pin are housed in oblong slots of a cylindrical part of the piston, these slots delimiting a maximum axial travel of the feeler with respect to the piston,
- the pin passes through at least one oblong slot formed in the plunger and defining a rest position of the plunger with respect to the booster piston.

In a first embodiment of the invention, the feeler is housed and guided in axial sliding in a cylindrical axial passage in the opposite end of the plunger to the push rod, and the plunger itself is guided in an axial cylindrical passage of the piston comprising, on the same side as the push rod, a radial wall formed with an axial orifice for the passage of the feeler.

In this embodiment, the feeler immobilizing means comprise a pivoting key mounted in a transverse housing of the piston and comprising an orifice through which the feeler passes with clearance, and elastic return means constantly urging the key to bear against the plunger.

This key can be moved by the plunger, under emergency braking, between a position of blocking the feeler and a position of bearing on the piston of the booster, in which position the key relaxes the feeler and allows the plunger to slide along the feeler in the direction of the push rod, in order to reduce the overall length of the plunger-feeler assembly.

In another embodiment of the invention, the plunger is housed and guided in sliding in an axial passage of the feeler, itself housed and guided in sliding in an axial passage of the booster piston.

In this embodiment, the immobilizing means comprise ramp or wedge means mounted between a cylindrical surface of the plunger and an internal frustoconical surface of the feeler.

Advantageously, these immobilizing means are formed of a plurality of tapered rollers that are distributed in a ring around the cylindrical surface of the plunger and that are held axially by two rings, or washers slipped over the plunger.

These immobilizing means are urged axially toward the push rod by elastic return means bearing against a shoulder of the plunger, and are pressed onto a pin engaged in transverse slots of the plunger, of the feeler and of the piston.

The pin defines a position of rest of the plunger and of the feeler when it is pressed against one end of the slots of the piston at the same end as the control rod.

The feeler itself is urged axially by elastic return means in a direction away from the push rod.

The invention will be better understood and other features, details and advantages thereof will become more clearly apparent in the light of the description which follows, given by way of example with reference to the attached drawings in which:

BRIEF DESCRIPTIONS OF THE DRAWINGS

DESCRIPTION OF THE PREFERRED EMBODIMENTS

In the description which follows, by convention, items located to the left in the figures will be described as being at the front, and items located to the right will be described as being to the rear.

Reference is made first of all to FIGS. 1 to 4 to describe a first embodiment of the invention and its operation.

Figure 1:
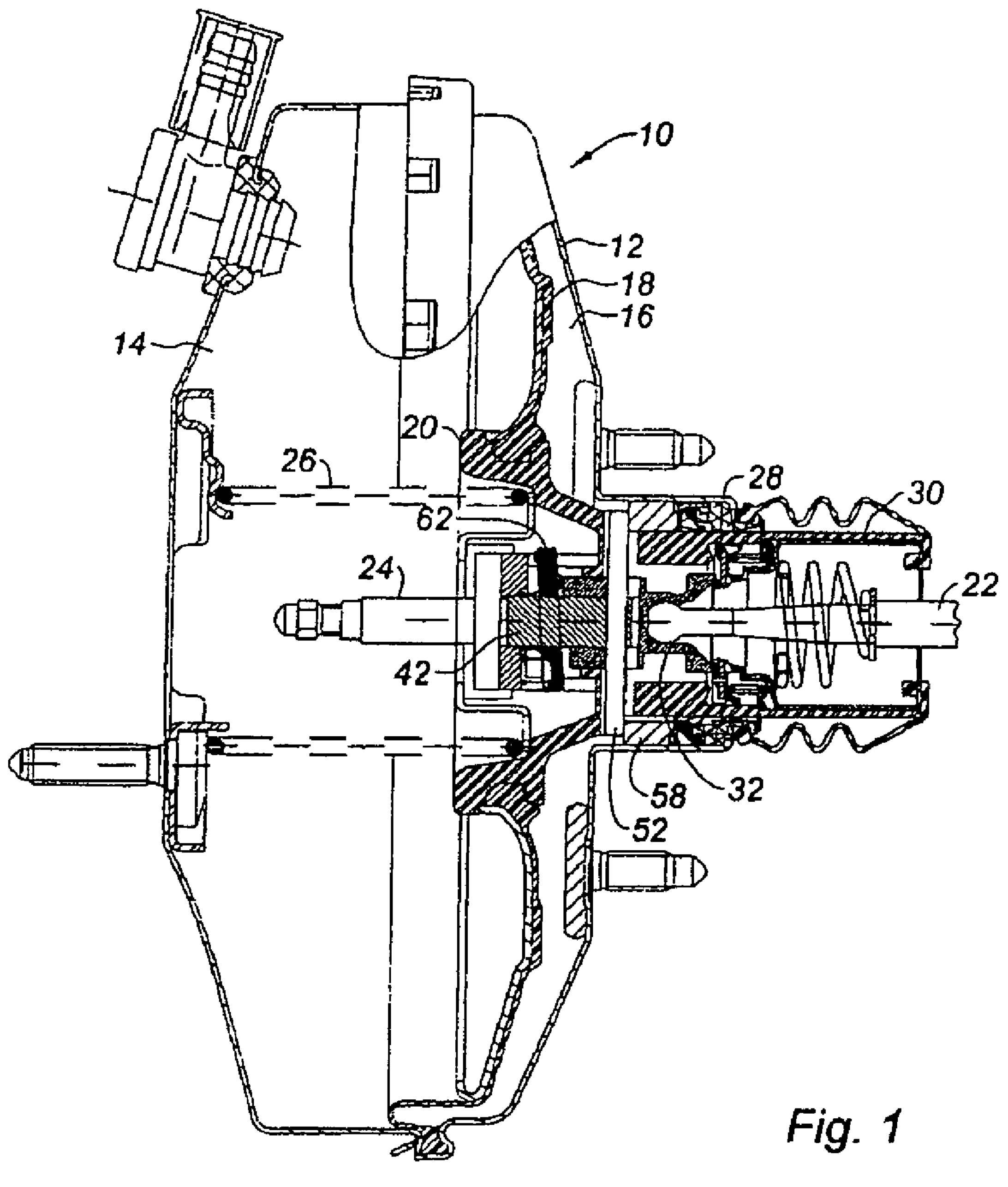
FIG. 1 is a schematic view in axial section of a booster according to the invention.

The booster 10 of FIG. 1 essentially comprises a rigid casing 12 in which a front chamber 14 and a rear chamber 16 are separated from one another by a moving transverse partition 18 which bears an axial piston 20. The front chamber 14 is intended to be connected to a vacuum source, while the rear chamber 16 is placed selectively in communication with the front chamber 14, in the absence of braking, or with the surrounding atmosphere, under braking.

The axial piston 20 of the booster is interposed between a control rod 22 actuated by a brake pedal (not depicted) and a push rod 24 which acts on a piston of a brake master cylinder (not depicted) at its front end. A return spring 26 mounted in the front chamber 14 constantly urges the piston 20 into its rear position of rest depicted in FIG. 1.

The rear part of the casing 12 forms an axial hollow shaft 28 in which a rear tubular cylindrical part 30 of the piston 20 is housed. The control rod 22 extends axially into this tubular part 30 and at its front end bears a plunger 32 guided in sliding in an axial passage 34 of the piston 20. The annular rear part 36 of the plunger 32 collaborates with an annular shutter 38 in a three-way valve which selectively, according to the axial position of the control rod 22 in the rear tubular part 30 of the piston 20, allows the rear chamber 16 of the booster to be connected either to the front chamber 14 or to the surrounding atmosphere.

The front part of the plunger 32 comprises an axial passage 40 in which there is guided in sliding a feeler 42 which extends forward and passes through an axial orifice 44 in a radial front face 46 of the piston 20 to come into contact, in the event of braking, with a reaction disk 48 made of substantially compressible material, such as rubber or an elastomer for example, which is mounted in a dish 50 at the rear end of the push rod 24.

The rear end of the feeler 42 bears a transverse pin 52 which runs through oblong slots 54 of the plunger 32 and 56 of the piston 20 and defines a position of rest or extreme rear position of the plunger 42 and of the feeler 42 when this pin 52 is resting against a rear stop 58 secured to the piston 20.

In the other direction, the pin 52 defines an extreme forward position of the feeler 42 with respect to the piston 20 when it is brought into contact with the front end of the slots 56 of the piston.

Means for axially immobilizing the feeler 42 with respect to the plunger 32 are provided between the front end of the plunger 32 and the radial front face 46 of the piston and are arranged in a transverse housing 60 of the piston. These means comprise a flat key 62 comprising a central orifice through which the feeler 42 passes with a small amount of clearance, a rear bearing rib 64 pivoting on the front face of the plunger 32 and a front bearing rib 66 pivoting on the front wall of the housing 60. At least one return spring 68 is mounted in the housing 60 between the front wall thereof and the key 62 to cause the latter to pivot on the rear rib 64 in the counterclockwise direction in FIGS. 1 and 2. In the example depicted, another return spring 70 is mounted around the feeler 42 and constantly urges the key 62 toward the front end of the plunger 32.

Figure 2:
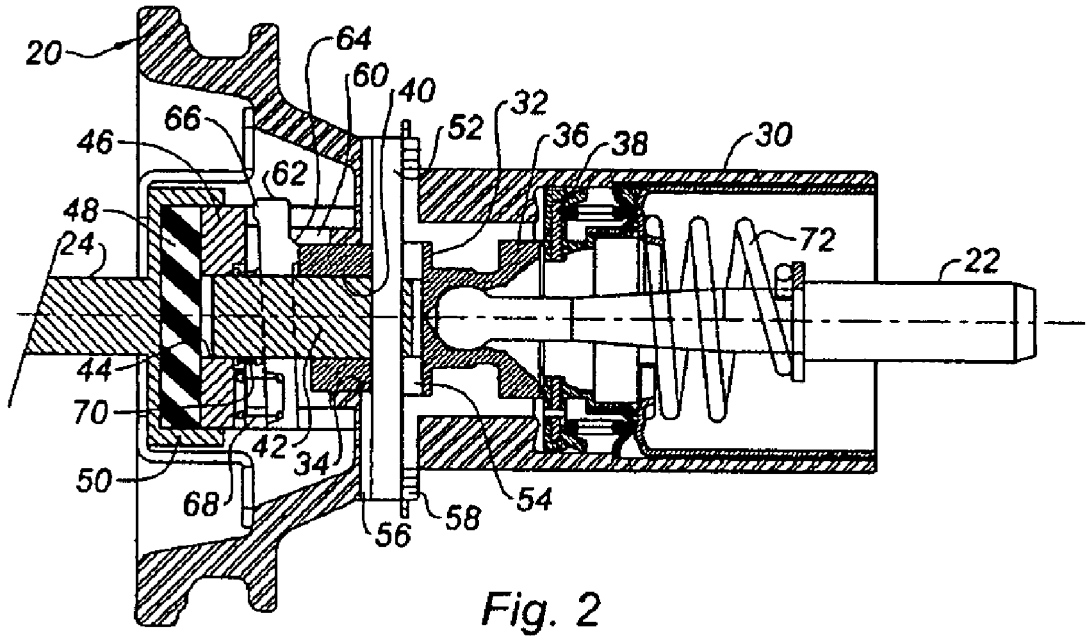
FIGS. 2 and 3 are schematic views on a larger scale in axial section in two perpendicular planes and depict the piston of the booster of FIG. 1.

When the key 62 is in an oblique position as depicted in FIGS. 1 and 2, it blocks the forward sliding of the plunger 32 on the feeler 42. When this key is more or less perpendicular to the axis of the booster, it can be moved in translation along the feeler 42 and therefore allows the plunger 32 to travel forward with respect to the feeler 42.

Figure 4:
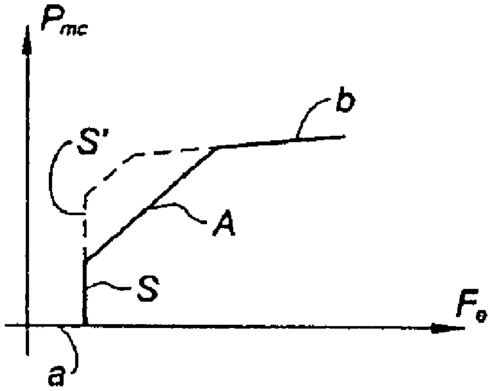
FIG. 4 is a graph depicting the curve of variation of output pressure of the master cylinder as a function of the input effort applied to the pedal.

When the various components of the booster are in the rest position as depicted in the drawings, the front face of the feeler 42 is separated from the reaction disk 48 by a distance that corresponds to the jump denoted S in the curve of FIG. 4, which is the curve of the variation in output pressure Pmc of the master cylinder as a function of the effort Fe applied to the brake pedal.

In a way known to those skilled in the art, this curve comprises a first phase a of taking up the dead travel, a second phase which corresponds to the jump S, for which the pressure increases at the output of the master cylinder without the input effort Fe increasing, a third phase A of assistance by the booster and a fourth phase b corresponding to booster saturation.

During the jump phase S no reaction is applied by the reaction disk 48 to the plunger 32 and to the control rod 22. At the end of this jump phase, the feeler 42 is in contact with the reaction disk 48 and transmits a feedback effort to the plunger 32 and to the control rod 22.

The booster depicted in FIGS. 1 to 3 operates as follows:

Under normal braking, the control rod 22 and the plunger 32 are moved forward at the same rate as the piston 20 and the feeler 42 remains blocked with respect to the plunger 32 by the key 62 occupying an oblique position as depicted in FIGS. 1 and 2.

In this case, the curve depicting the variation in output pressure Pmc of the master cylinder as a function of the input effort Fe is the one depicted in solid line in FIG. 4.

Under emergency braking, the control rod 22 and the plunger 32 are moved forward more quickly than the piston 20, which means that the plunger 32 pushes the key 62 forward. When this key comes into abutment via its front rib 66 against the front face 46 of the piston, it pivots in the clockwise direction and adopts a substantially vertical position with respect to the axis of the booster, thus allowing the plunger 32 to slide forward with respect to the feeler 42. This results in a reduction in the overall length of the assembly formed of the plunger 32 and of the feeler 42. If the driver then slightly relaxes the effort he is applying to the brake pedal, the control rod 22 and the plunger 32 are returned backward slightly by the return spring 72 of the control rod 22, the key 62 pivots on the rib 64 toward the plunger 32 and readopts an oblique position of axially blocking the plunger and the feeler with respect to one another. The reduction in the total length of the plunger-feeler assembly results in an increase in the distance between the front face of the feeler and the reaction disc 48.

If when the driver reapplies a significant effort to the brake pedal, the control rod 22 and the plunger 32 are moved forward again, driving along the feeler 42 blocked by the key 62 which is bearing against the plunger. That corresponds to an increase in jump which extends from S to S' on the curve of FIG. 4, and the output pressure Pmc of the master cylinder varies according to the input effort Fe as depicted by the curve shown in dotted line. The assistance provided by the booster, which is greater in this case than it was in the previous case for the same input effort, therefore encourages emergency braking.

Figure 3:
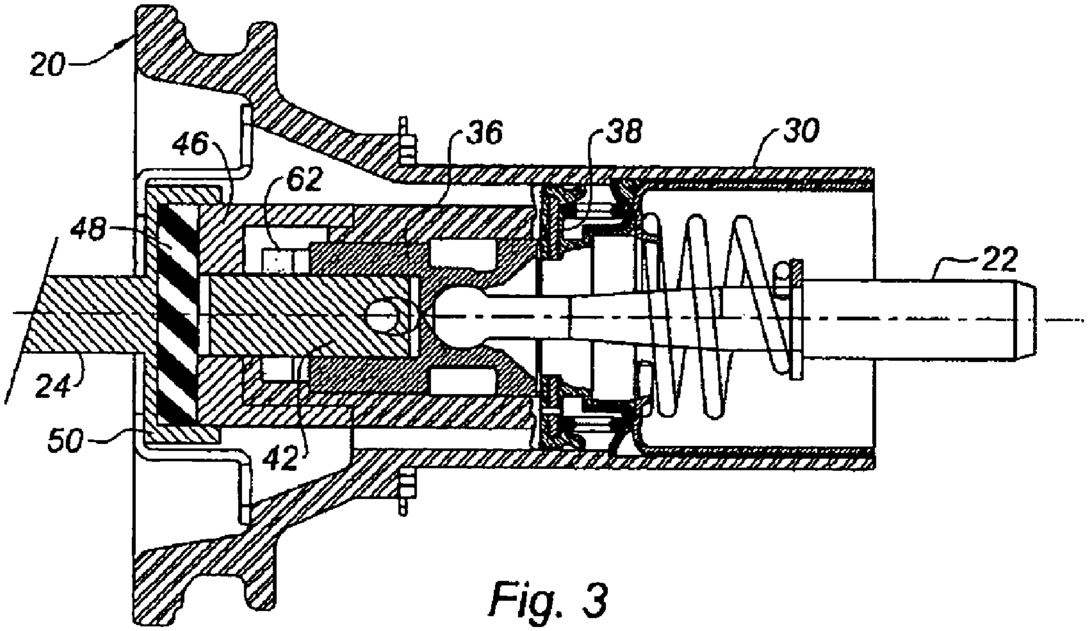

When the driver relaxes the effort he is applying to the brake pedal, the backward movement of the control rod 22 and of the plunger 32 returns the pin 52 to bear against the rear stop 58 of the piston and the pin 52 itself returns the feeler 42 to the rest position depicted in FIGS. 1 to 3.

Figure 5:
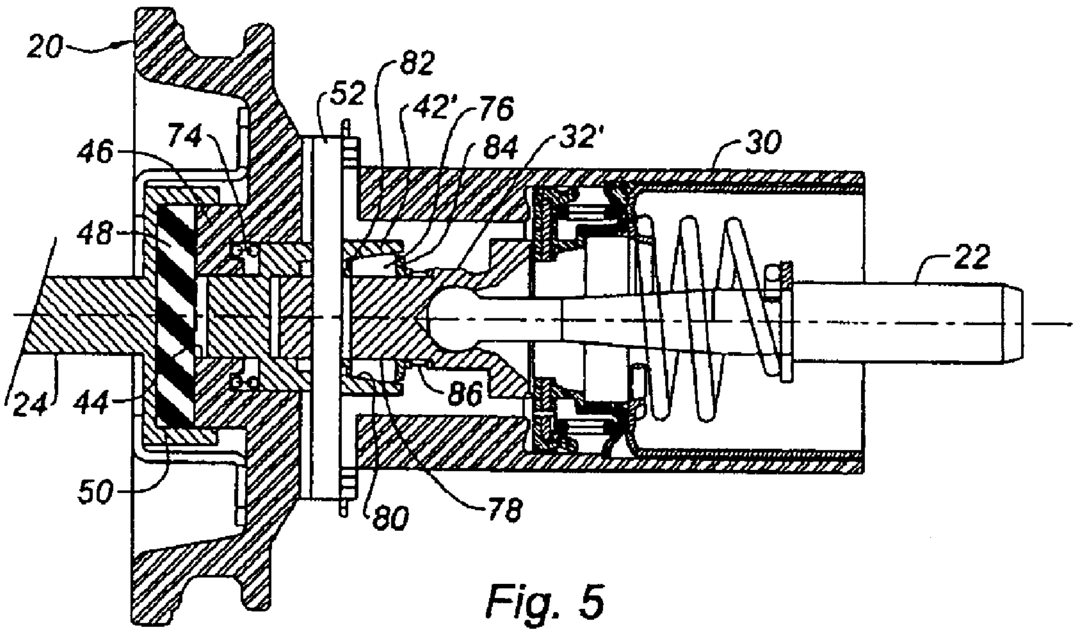
FIGS. 5 and 6 are views corresponding to FIGS. 2 and 3 respectively and depict an alternative form of embodiment of the invention.
Figure 6:
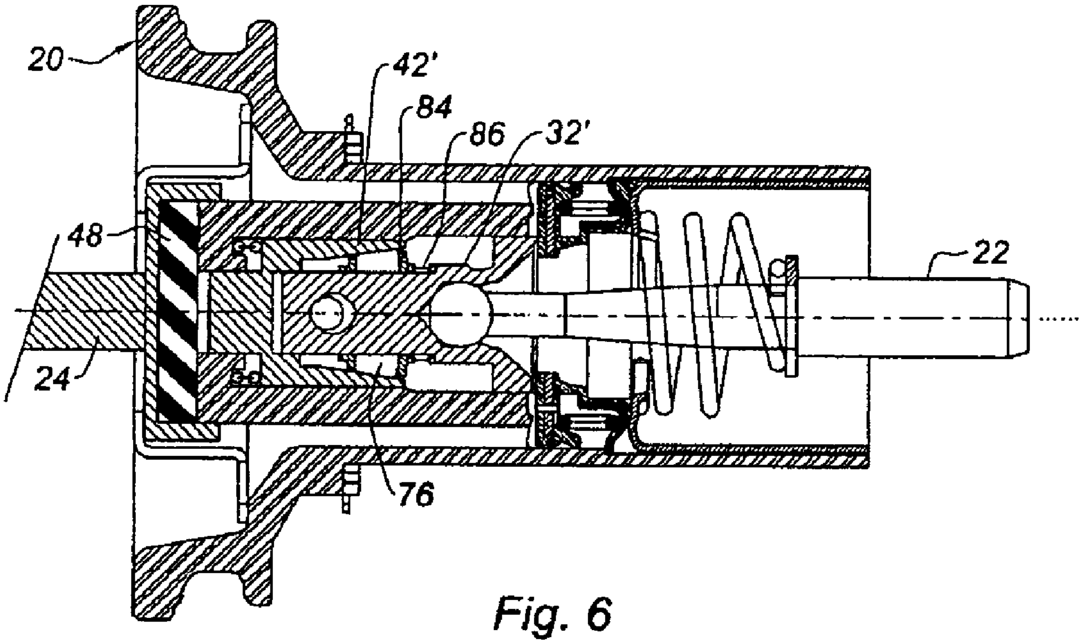

The alternative form of the embodiment in FIGS. 5 and 6 differs from the embodiment of FIGS. 1 to 3 essentially in the means of relative immobilization of the plunger and of the feeler with respect to each other.

In this alternative form of the embodiment, the plunger 32' mounted at the front end of the control rod 22 is housed and guided in a blind axial passage of the feeler 42' a front part of which is guided in axial translation in the cylindrical passage 44 of the front face 46 of the piston 20 so as to be able to come to bear against the reaction disk 48 mounted in the dish 50 at the end of the push rod 24.

A return spring 74 is mounted between the front face 46 of the piston and the front face of the feeler 42' to urge the latter constantly rearward.

A transverse pin 52 is mounted in oblong slots of the plunger 32', of the feeler 42' and of the piston 20 to define a position of rest of the plunger 32' and of the feeler 42', which position is depicted in the drawings.

Figure 7:
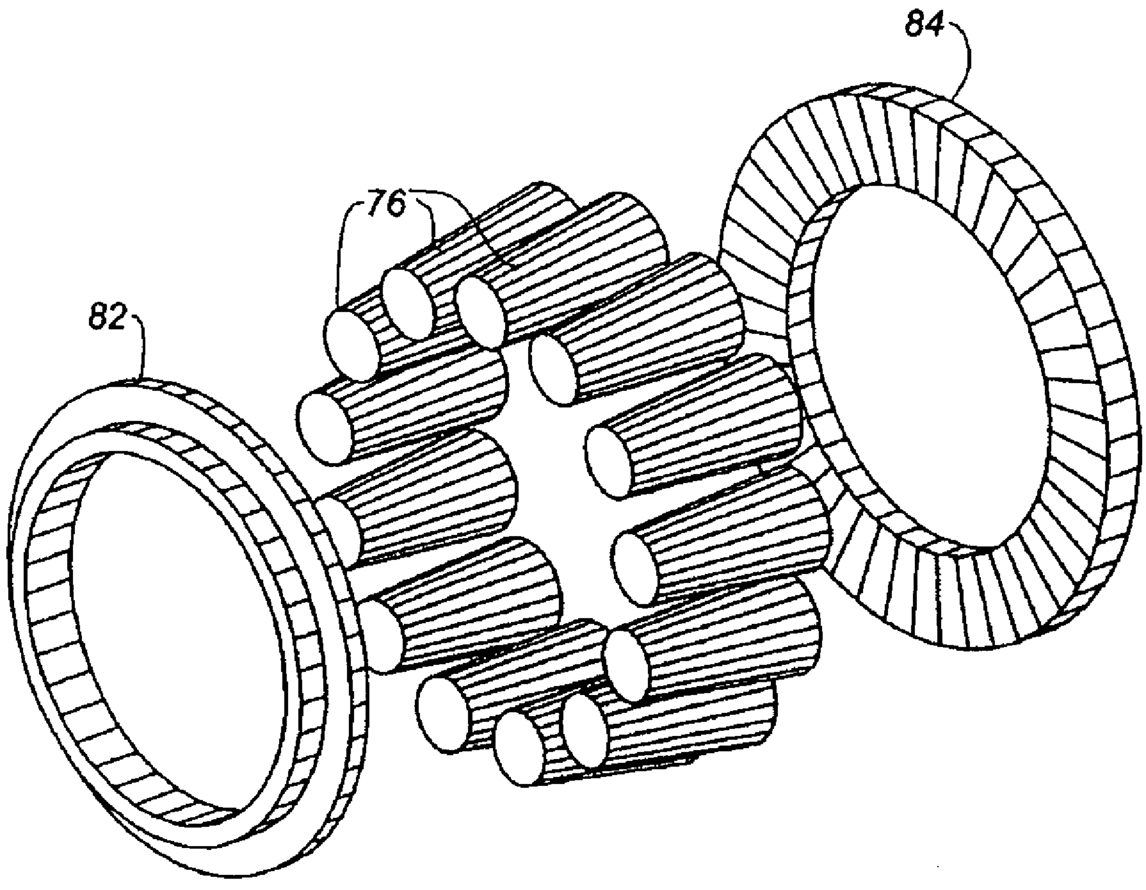
FIG. 7 is a schematic view in perspective, on a larger scale, of the immobilizing means depicted in FIGS. 5 and 6.

The means of axial immobilization of the feeler and of the plunger relative to each other are of the ramp or wedge type and comprise, as can best be seen in FIG. 7, a series of taper rollers 76 which surround the plunger 32' and are housed inside the rear part of the feeler 42' between a cylindrical surface 78 of circular cross section belonging to the plunger 32' and an internal frustoconical surface 80 belonging to the feeler 42'. The rollers 76 are orientated with their large base rearward and their small base forward and are held axially between two rings 82 and 84 slipped onto the plunger 32'. The assembly is constantly urged forward by a return spring 86 mounted between the rear ring 84 and a shoulder of the cylindrical surface of the plunger 32'. The front ring 82 is thus kept pressed against the transverse pin 52.

This alternative form of the embodiment operates as follows:

Under normal braking, the control rod 22 and the plunger 32' are moved forward at the same rate as the piston 20 of the booster, and the positions depicted in FIGS. 5 and 6 are maintained. The jump phase S on the curve of FIG. 4 is determined by the distance which, at rest, separates the front face of the feeler 42' from the reaction disc 48.

Under emergency braking, the control rod 22 and the plunger 32' are moved forward more quickly than the piston 20 of the booster and carry along with them the feeler 42' until the latter comes into abutment against the pin 52, itself bearing against the piston 20. The plunger 32' can thus advance to a greater or lesser extent with respect to the feeler 42', according to its rate of travel, and this has a greater or lesser lengthening effect on the overall length of the plunger-feeler assembly. If then the driver slightly relaxes the effort he is exerting on the brake pedal, the feeler 42', the plunger 32' and the control rod 22 move slightly rearward, the feeler 42' being blocked in position on the plunger 32 by the taper rollers 76. If the driver than reapplies significant effort to the brake pedal, the control rod 22, the plunger 32' and the feeler 42' are moved forward. During this phase, the jump S in the curve of FIG. 4 is increased to S' as depicted in the curve in dotted line in FIG. 4, and this corresponds to an increase in the emergency brake assistance, this increase being dependent on the rate of travel of the plunger and of the control rod during the initial phase of the emergency braking action.

I claim:

1. A pneumatic brake booster for use in a motor vehicle having an axial piston (20) interposed between an output push rod (24) and a plunger (32) connected to the end of a control rod (22) to define a plunger-feeler assembly and emergency brake assist means comprising a feeler (42) connected to the plunger (32) and moved by axial sliding with respect to the plunger (32) and means for axially immobilizing the feeler (42) by blocking the movement of the feeler (42) with respect to the plunger (32) at rest and during a brake application when a rate of travel of the control rod (22) and of the plunger (32) is below a limit value, and to allow the plunger (32) to slide with respect to the feeler (42) in a direction to reduce an axial length of the plunger-feeler assembly during an emergency brake application when the rate of travel of the control rod and of the plunger is above said limit value, said feeler (42') comprising means (52) collaborating with the piston (20) to define a position of rest of the feeler, characterizing a pin (52) mounted in a transverse orifice of the feeler (42) with first and second ends that are respectively located in first and second oblong slots (56) of a cylindrical part of the piston (20) to delimit a maximum axial travel of the feeler (42) with respect to the piston (20).

2. The booster according to claim 1, characterized in that said pin (52) passes through at least one oblong slot (54) formed in the plunger (32, 32') and defining a rest position of the plunger with respect to the piston (20).

3. The booster according to claim 2, characterized in that the feeler (42) is housed and guided in sliding in a cylindrical axial passage (40) of the plunger (32).

4. The booster according to claim 3, characterized in that said plunger (32) is guided in an axial cylindrical passage (34) of the piston (20), and has on a same side as the push rod (22) a radial wall (46) formed with an axial orifice (44) for the passage of the feeler (42).

5. The booster according to claim 4, characterized in that said means (52) for immobilizing comprise a pivoting key (62) mounted in a transverse housing (60) of the piston (20), an orifice through which the feeler (42) passes with clearance, and elastic return means (70) constantly urging the key (62) to bear against the plunger (32).

6. The booster according to claim 5, characterized in that said key (62) is moved by the plunger (32) during an emergency brake application between a position of blocking the feeler (42) and a position of bearing on the piston (20) of the booster to relax the feeler and to allow the plunger (32) to slide with respect to the feeler in a direction of the push rod (24).

* * * * *